United States Patent
Sandhya et al.

(10) Patent No.: US 12,356,373 B2
(45) Date of Patent: Jul. 8, 2025

(54) NONCONFORMING NETWORK ALLOCATION VECTOR (NAV) DETECTION AND MITIGATION

(71) Applicant: Synaptics Incorporated, San Jose, CA (US)

(72) Inventors: Patil Sandhya, Bangalore (IN); Girish Anantrao Madpuwar, Bangalore (IN); Anil Kumar Maguluri, Bangalore (IN)

(73) Assignee: Synaptics Incorporated, San Jose, CA (US)

( * ) Notice: Subject to any disclaimer, the term of this patent is extended or adjusted under 35 U.S.C. 154(b) by 30 days.

(21) Appl. No.: 18/519,768

(22) Filed: Nov. 27, 2023

(65) Prior Publication Data

US 2025/0175946 A1    May 29, 2025

(51) Int. Cl.
*H04W 72/02* (2009.01)
*H04L 5/00* (2006.01)
*H04W 28/26* (2009.01)
*H04W 72/0453* (2023.01)

(52) U.S. Cl.
CPC ........... *H04W 72/02* (2013.01); *H04L 5/0053* (2013.01); *H04W 28/26* (2013.01); *H04W 72/0453* (2013.01)

(58) Field of Classification Search
CPC . H04L 63/1458; H04L 63/14; H04L 63/1441; H04W 12/122
See application file for complete search history.

(56) References Cited

U.S. PATENT DOCUMENTS

| | | | |
|---|---|---|---|
| 7,295,524 B1 * | 11/2007 | Gray | H04L 63/1416 370/254 |
| 8,295,255 B2 | 10/2012 | Nakano | |
| 2004/0027988 A1 * | 2/2004 | Billhartz | H04L 63/1408 370/236 |

(Continued)

FOREIGN PATENT DOCUMENTS

WO    WO-2016082230 A1 *    6/2016    ......... H04L 29/06

OTHER PUBLICATIONS

Extended European Search Report dated May 8, 2025, from EP Application No. 24215046.4-1206.

*Primary Examiner* — Douglas B Blair
(74) *Attorney, Agent, or Firm* — Paradice & Li LLP

(57) ABSTRACT

This disclosure provides methods, devices, and systems for wireless communications. The present implementations more specifically relate to techniques for changing the channel of a Basic Service Set (BSS) when a wireless communication device attempts to monopolize access to a shared wireless medium. In some aspects, an access point (AP) may be configured to detect nonconforming Network Allocation Vectors (NAVs) that extend the duration for which another wireless communication device has already reserved access to a shared wireless medium. For example, the wireless communication device may cause the AP to set a nonconforming NAV by transmitting a packet that reserves the shared wireless medium for a duration overlapping with, but ending later than, another duration for which the same wireless communication device has already reserved the shared medium. In some implementations, the AP may switch its BSS to a different wireless channel in response to detecting one or more nonconforming NAVs.

20 Claims, 10 Drawing Sheets

(56) References Cited

U.S. PATENT DOCUMENTS

| | | | |
|---|---|---|---|
| 2004/0028000 A1* | 2/2004 | Billhartz | H04W 12/121 370/312 |
| 2004/0028001 A1* | 2/2004 | Billhartz | H04W 12/122 370/312 |
| 2004/0028016 A1* | 2/2004 | Billhartz | H04L 63/1416 370/389 |
| 2007/0076742 A1* | 4/2007 | Du | H04W 8/04 370/445 |
| 2009/0235354 A1* | 9/2009 | Gray | H04L 63/1416 709/224 |
| 2014/0321317 A1* | 10/2014 | Kasslin | H04W 48/16 370/254 |
| 2014/0335871 A1* | 11/2014 | Doppler | H04W 16/02 455/448 |
| 2015/0063251 A1 | 3/2015 | Asterjadhi | |
| 2020/0229139 A1* | 7/2020 | Ma | H04W 72/30 |
| 2023/0232452 A1 | 7/2023 | Li et al. | |
| 2024/0114346 A1* | 4/2024 | Patil | H04L 47/70 |
| 2024/0214813 A1* | 6/2024 | Mishra | H04W 12/122 |

\* cited by examiner

NONCONFORMING NETWORK ALLOCATION VECTOR (NAV) DETECTION AND MITIGATION

TECHNICAL FIELD

The present implementations relate generally to wireless communication, and specifically to nonconforming network allocation vector (NAV) detection and mitigation.

BACKGROUND OF RELATED ART

A wireless local area network (WLAN) may be formed by one or more access points (APs) that provide a shared wireless communication medium for use by a number of client devices, also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN. The process of establishing a communication link is generally referred to as "association," and involves an exchange of association frames between an AP and a STA. The STA is "associated" with the AP upon completion of the association process.

Access to the shared wireless medium is generally governed by a distributed coordination function (DCF), such as carrier sense multiple access with collision avoidance (CSMA/CA). With CSMA/CA, there is generally no centralized master device allocating time and frequency resources of the shared wireless medium. Rather, any wireless communication device (such as an AP or a STA) attempting to transmit data must wait a random backoff (RBO) duration and contend for access to the wireless medium. More specifically, after the RBO duration expires, a wireless communication device must perform a clear channel assessment (CCA) and determine that the desired wireless channel is idle before it can transmit data on that channel.

Existing versions of the IEEE 802.11 standard require a "duration" field to be included in a Medium Access Control (MAC) header of each packet transmitted on a wireless medium. The duration field specifies a duration for which the medium is reserved by the transmitting device. For example, in some applications, the duration field may indicate a duration that the packet occupies the wireless medium. Wireless communication devices that detect the packet on the wireless medium set their respective Network Allocation Vectors (NAVs) according to the duration indicated in the duration field. The NAV is a virtual carrier-sensing mechanism that prevents a wireless communication device from attempting to access the wireless medium (such as according to CSMA/CA) for the duration indicated in the duration field of the detected packet. For example, the wireless communication device may assume the wireless medium is busy when its NAV has a nonzero value.

A transmitting device conforming to the IEEE 802.11 standard may not prolong its access to a shared wireless medium (such as by transmitting additional packets carrying extended duration information) before the duration indicated by the duration field of a previously transmitted packet expires. However, some wireless communication devices that do not conform to the IEEE 802.11 standard (also referred to herein as "rogue" devices) may utilize such techniques to monopolize access to a shared wireless medium. Thus, there is a need for wireless communication devices that operate in accordance with the IEEE 802.11 standard to avoid rogue devices attempting to monopolize access to a shared wireless medium or disrupt communications between other wireless communication devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a wireless communication device. The method includes detecting, on a first wireless channel, a first packet transmitted by a neighboring device, where the first packet has a duration field indicating a duration for which the first wireless channel is reserved by the neighboring device; detecting, on the first wireless channel, a second packet transmitted by the neighboring device, where the second packet has a duration field indicating a duration that overlaps with the duration indicated by the first packet and ends later than the duration indicated by the first packet; and selectively switching a basic service set (BSS) associated with the wireless communication device from the first wireless channel to a second wireless channel based at least in part on detecting the second packet.

Another innovative aspect of the subject matter of this disclosure can be implemented in a wireless communication device including a processing system and a memory. The memory stores instructions that, when executed by the processing system, causes the wireless communication device to detect, on a first wireless channel, a first packet transmitted by a neighboring device, where the first packet has a duration field indicating a duration for which the first wireless channel is reserved by the neighboring device; detect, on the first wireless channel, a second packet transmitted by the neighboring device, where the second packet has a duration field indicating a duration that overlaps with the duration indicated by the first packet and ends later than the duration indicated by the first packet; and selectively switch a BSS associated with the wireless communication device from the first wireless channel to a second wireless channel based at least in part on detecting the second packet.

BRIEF DESCRIPTION OF THE DRAWINGS

The present implementations are illustrated by way of example and are not intended to be limited by the figures of the accompanying drawings.

DETAILED DESCRIPTION

Figure 1:
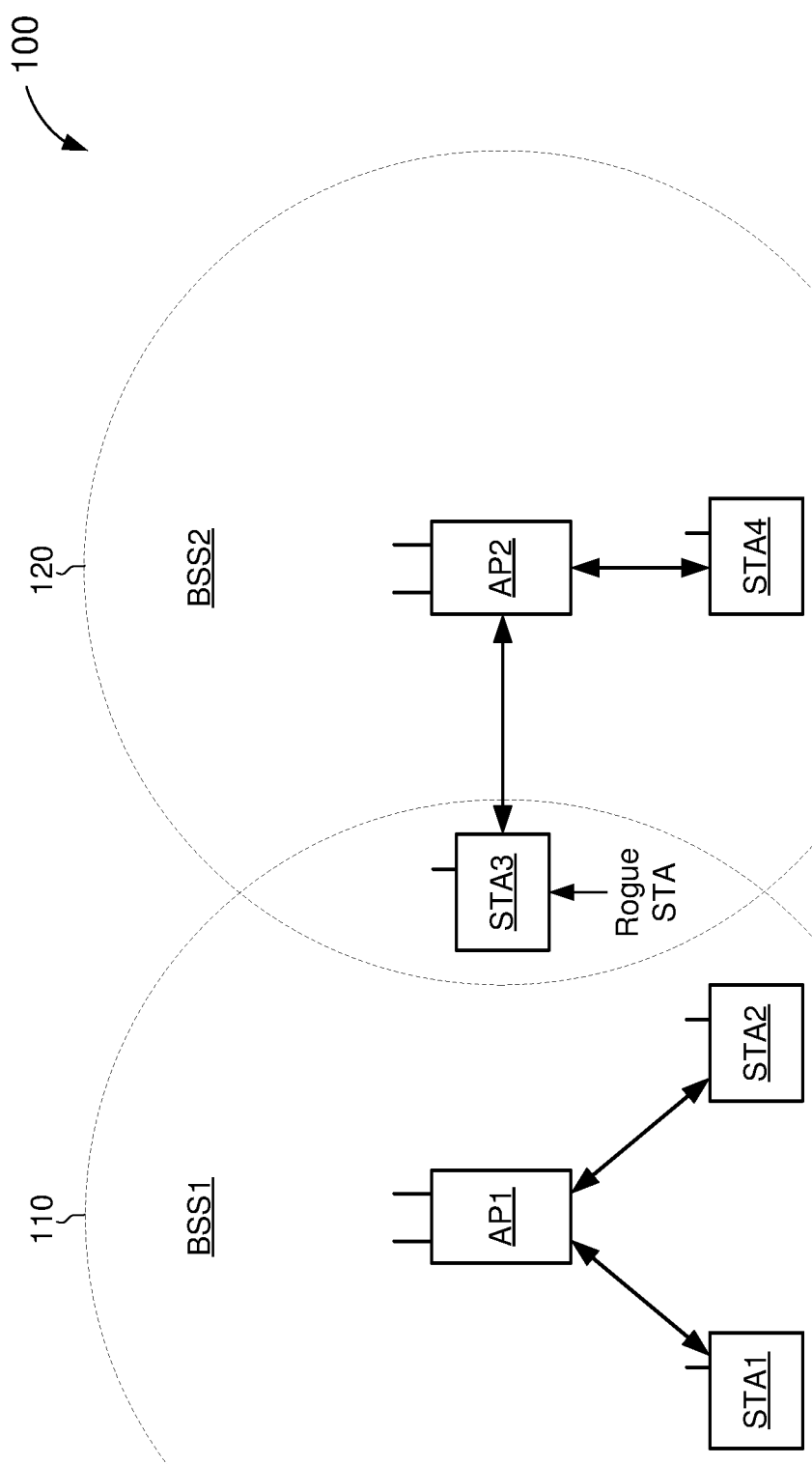
FIG. 1 shows an example wireless communication environment.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the present disclosure can be implemented by any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the $3^{rd}$ Generation Partnership Project (3GPP), among others. Aspects of the present disclosure can be implemented by any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. Aspects of the present disclosure also can be implemented using other wireless communication protocols or RF signals suitable for use in one or more of a wireless personal area network (WPAN), a wireless local area network (WLAN), a wireless wide area network (WWAN), or an Internet of Things (IoT) network.

As described above, a transmitting device that does not conform to the IEEE 802.11 standard (also referred to herein as a "rogue" device) may attempt to prolong its access to a shared wireless medium (such as by transmitting additional packets carrying extended duration information) before the duration indicated by the duration field of a previously transmitted packet expires. As a result, a rogue device can monopolize access to a shared wireless medium. Aspects of the present disclosure recognize that a wireless communication device can avoid interference from a rogue device by switching its communications to a new wireless channel (different than the channel on which the rogue device is transmitting). For example, existing versions of the IEEE 802.11 standard define a channel switch announcement (CSA) element that can be used by an access point (AP) to signal a change in wireless channel for its Basic Service Set (BSS).

Various aspects relate generally to avoiding disruptions in wireless communications, and more particularly, to techniques for changing the channel of a BSS when a rogue device attempts to monopolize access to a shared wireless medium. In some aspects, an AP may detect nonconforming Network Allocation Vectors (NAVs) associated with packets transmitted by a rogue device. As used herein, the term "nonconforming NAV" refers to any NAV that effectively extends the duration for which a rogue device has already reserved access to a wireless channel. For example, a rogue device may cause the AP to set a nonconforming NAV by transmitting a packet that reserves a shared wireless medium for a duration overlapping with, but ending later than, another duration for which the rogue device has already reserved the shared medium. In some implementations, the AP may switch its BSS to a different wireless channel in response to detecting a threshold number (N) of nonconforming NAVs. For example, the AP may not set its NAV in response to the $N^{th}$ attempt by the rogue device to extend its reservation of the wireless medium. Rather, the AP may transmit a CSA message to its associated wireless stations (STAs) signaling the switch in wireless channels.

Particular implementations of the subject matter described in this disclosure can be implemented to realize one or more of the following potential advantages. By detecting nonconforming NAVs, aspects of the present disclosure can avoid disruptions to wireless communications caused by rogue devices. Unlike existing APs that conform to the IEEE 802.11 standard, the APs of the present implementations are aware of when a rogue device may be attempting to monopolize access to a shared wireless medium. Accordingly, such APs may take remedial action to protect communications within their BSSs from disruptions by the rogue device (such as by refraining from setting the NAV once a threshold number of nonconforming NAVs have been detected, and by switching the BSS to a new wireless channel). Moreover, aspects of the present disclosure can be implemented using protocols supported by existing versions of the IEEE 802.11 standard. Thus, the techniques for detecting and responding to nonconforming NAVs can be implemented with only minor modifications to existing wireless communication devices.

FIG. 1 shows an example wireless communication environment 100. The wireless communication environment 100 is shown to include two access points AP1 and AP2 and a number of wireless stations STA1-STA4. Although two APs and four STAs are shown in the example of FIG. 1, the environment 100 may include any number of APs and any number of STAs.

The wireless stations STA1-STA4 may include any suitable wireless communication device including, among other examples, a cell phone, a personal digital assistant (PDA), a table device, or other personal computing device. A STA also may be referred to as a user equipment (UE), a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or some other suitable terminology. Each of the wireless stations STA1-STA4 may include one or more transceivers, one or more processing resources (such as processors or ASICs), one or more memory resources, and a power source (such as a battery).

Each of the access points AP1 and AP2 may be any suitable device that allows one or more wireless communication devices to connect to a wireless communication network (such as a local area network (LAN), a wide area network (WAN), metropolitan area network (MAN), or the Internet) using Wi-Fi, Bluetooth, or any other suitable wireless communication standards. In some aspects, each wireless communication network may be a WLAN, such as a Wi-Fi network. For example, each wireless communication network may implement at least one of the IEEE 802.11 family of wireless communication protocol standards. In some implementations, at least one of the access points AP1 or AP2 may be any suitable wireless communication device (such as a STA) acting as a software-enabled access point (SoftAP). Each of the access points AP1 and AP2 may include one or more transceivers, one or more processing resources (such as processors or ASICs), one or more memory resources, and a power source.

Each of the access points AP1 and AP2 may correspond to, or provide, a respective Basic Service Set (BSS). More specifically, AP1 may form a BSS (BSS1) with a respective coverage area 110 which includes STA1 and STA2, whereas AP2 may form a BSS (BSS2) with a respective coverage area 120 which includes STA3 and STA4. In the example of FIG. 1, the coverage areas 110 and 120 of BSS1 and BSS2, respectively, are shown to overlap. Thus, BSS1 and BSS2 may be referred to as "overlapping" BSSs (OBSSs). In some implementations, BSS1 and BSS2 may operate on the same wireless channel so that wireless communication devices belonging to different BSSs may share access to the same wireless medium. For example, wireless communication devices associated with BSS1 (such as AP1, STA1, or STA2) may detect or otherwise sense wireless communications between devices associated with BSS2 (such as AP2, STA3, or STA4).

In some aspects, access to the shared wireless medium may be governed by a distributed coordination function (DCF), such as carrier sense multiple access with collision avoidance (CSMA/CA), according to the IEEE 802.11 standard. With CSMA/CA, there is generally no centralized master device allocating time and frequency resources of the shared wireless medium. Rather, any wireless communication device (such as an AP or a STA) attempting to transmit data must wait a random backoff (RBO) duration and contend for access to the wireless medium. More specifically, after the RBO duration expires, a wireless communication device must perform a clear channel assessment (CCA) and determine that the desired wireless channel is idle before it can transmit a communications packet, or physical layer convergence protocol (PLCP) protocol data unit (PPDU), on that channel.

A PPDU is communications packet conforming to the IEEE 802.11 standard. The PPDU format is a composite structure that includes a physical layer (PHY) preamble and a payload in the form of a PHY service data unit (PSDU). The information provided in the preamble may be used by a receiving device to decode the subsequent data in the PSDU. The PSDU may represent or "carry" one or more medium access control (MAC) protocol data unit (MPDU) frames. Each MPDU frame includes a MAC header followed by the data portion (also referred to as the "payload" or "frame body") of the MPDU frame. Existing versions of the IEEE 802.11 standard require a "duration" field to be included in the MAC header of each PPDU. The duration field indicates a duration for which the medium is reserved by the transmitting device. For example, in some applications, the duration field may indicate an amount of time required to transmit the PPDU over the wireless medium.

Wireless communication devices that detect a PPDU on a shared wireless medium set their respective Network Allocation Vectors (NAVs) according to the duration indicated in the duration field. The NAV is a virtual carrier-sensing mechanism that prevents a wireless communication device from attempting to access the wireless medium (such as according to CSMA/CA) for the duration indicated in the duration field of the PPDU. For example, the wireless communication device may assume the wireless medium is busy when its NAV has a nonzero value. A transmitting device conforming to the IEEE 802.11 standard may not prolong its access to a shared wireless medium (such as by transmitting additional packets carrying extended duration information) before the duration indicated by the duration field of a previously transmitted packet expires. However, some wireless communication devices may not conform to the IEEE 802.11 standard. Such nonconforming wireless communication devices may be referred to herein as "rogue" devices.

In the example of FIG. 1, STA3 is depicted as a rogue STA that is located within the region of overlap between the coverage areas 110 and 120. As a result, PPDUs transmitted by STA3 (such as to AP2) may be detected by wireless communication devices associated with BSS1 (such as AP1, STA1, or STA2). In some instances, STA3 may attempt to monopolize or otherwise prolong its access to the shared wireless medium beyond what is permissible according to existing versions of the IEEE 802.11 standard. For example, STA3 may transmit a first packet having a duration field indicating a first duration and, before the expiry of the first duration, transmit a second packet having a duration field indicating a second duration that overlaps with the first duration but ends at a later time. By repeating this process, STA3 can continuously recapture the wireless medium before other wireless communication devices can even sense that the medium is idle.

Figure 2:
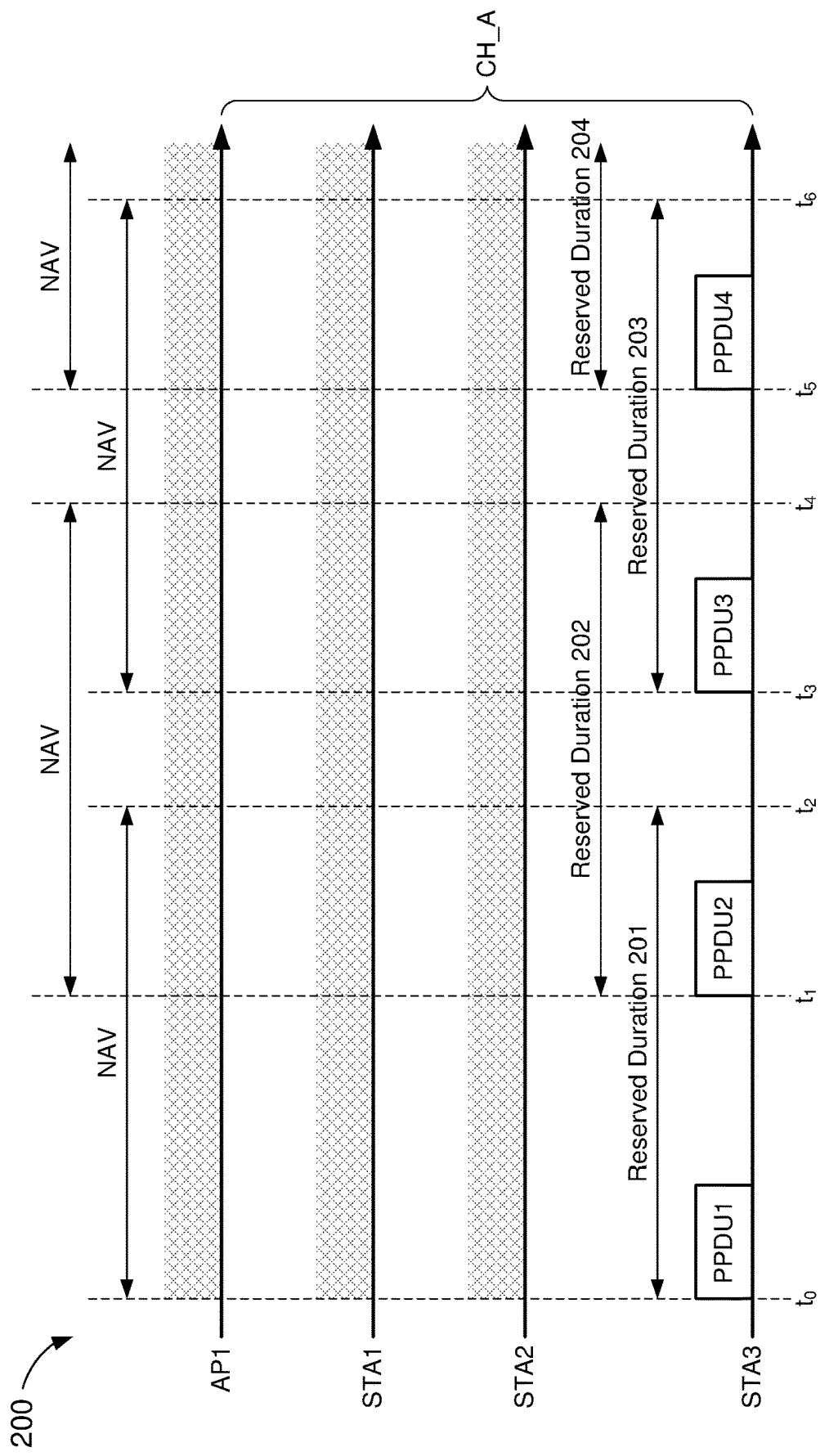
FIG. 2 shows a timing diagram depicting example wireless communications by wireless communication devices associated with the wireless communication environment of FIG. 1.

FIG. 2 shows a timing diagram 200 depicting example wireless communications by wireless communication devices associated with the wireless communication environment 100 of FIG. 1 (including AP1, STA1, STA2, and STA3). With reference for example to FIG. 1, AP1 forms a BSS (such as BSS1) that includes STA1 and STA2, whereas STA3 is a rogue STA belonging to an OBSS (such as BSS2) that overlaps the BSS associated with AP1. In the example of FIG. 2, AP1, STA1, STA2, and STA3 are shown to operate on the same wireless channel (CH_A). Due to the proximity of the wireless communication devices, wireless transmissions by STA3 can be detected by AP1, STA1, and STA2.

At time $t_0$, STA3 transmits a first PPDU (PPDU1) that reserves the wireless medium for a duration 201 from times $t_0$ to $t_2$. For example, the duration field in the MAC header of PPDU1 may indicate the reserved duration 201. Other wireless communication devices listening on the wireless channel CH_A (such as AP1, STA1, and STA2) may detect the transmission of PPDU1 and set their NAVs according to the reserved duration 201. As a result of setting their respective NAVs, AP1, STA1, and STA2 may (virtually) sense that the wireless channel CH_A is busy between times $t_0$ and $t_2$ and refrain from accessing the wireless medium.

As shown in FIG. 2, the reserved duration 201 is greater than the duration required to transmit PPDU1. In some implementations, PPDU1 may be a request-to-send (RTS) frame that solicits a clear-to-send (CTS) response from a receiving device (such as AP2 of FIG. 1). In response to receiving a CTS frame, STA3 may proceed to transmit data to the receiving device. In such implementations, the reserved duration 201 may additionally encompass the transmission of the CTS frame by the receiving device, the transmission of data by STA3, and an acknowledgement (ACK) message transmitted by the receiving device in response to receiving the data transmission.

At time $t_1$, STA3 transmits a second PPDU (PPDU2) that reserves the wireless medium for a duration 202 from times $t_1$ to $t_4$. For example, the duration field in the MAC header of PPDU2 may indicate the reserved duration 202. Other wireless communication devices listening on the wireless channel CH_A (such as AP1, STA1, and STA2) may detect the transmission of PPDU2 and reset their NAVs according to the reserved duration 202. As a result of resetting their respective NAVs, AP1, STA1, and STA2 may (virtually) sense that the wireless channel CH_A is busy between times $t_1$ and $t_3$ and continue to refrain from accessing the wireless medium.

In some implementations, PPDU2 may be an RTS frame (similar to PPDU1). As shown in FIG. 2, the reserved duration 202 overlaps with the reserved duration 201 but also ends at a later time (such as at time $t_4$ compared to time $t_2$). As a result, PPDU2 effectively extends the duration for which STA3 has access to the shared wireless medium. More specifically, the combined transmissions of PPDU1 and PPDU2 may prevent AP1, STA1, and STA2 from contending for access to the wireless channel CH_A for the entireties of the overlapping durations 201 and 202 (from times $t_0$ to $t_4$).

At time $t_3$, STA3 transmits a third PPDU (PPDU3) that reserves the wireless medium for a duration 203 from times $t_3$ to $t_6$. For example, the duration field in the MAC header of PPDU3 may indicate the reserved duration 203. Other wireless communication devices listening on the wireless channel CH_A (such as AP1, STA1, and STA2) may detect the transmission of PPDU3 and reset their NAVs according to the reserved duration 203. As a result of resetting their respective NAVs, AP1, STA1, and STA2 may (virtually) sense that the wireless channel CH_A is busy between times $t_3$ and $t_6$ and continue to refrain from accessing the wireless medium.

In some implementations, PPDU3 may be an RTS frame (similar to PPDU1 or PPDU2). As shown in FIG. 2, the reserved duration 203 overlaps with the reserved duration 202 but also ends at a later time (such as at time to compared to time $t_4$). As a result, PPDU3 further extends the duration for which STA3 has access to the shared wireless medium. More specifically, the combined transmissions of PPDU1, PPDU2, and PPDU3 may prevent AP1, STA1, and STA2 from contending for access to the wireless channel CH_A for the entireties of the overlapping durations 201-203 (from times to and $t_6$).

At time $t_4$, STA3 transmits a fourth PPDU (PPDU4) that reserves the wireless medium for a duration 204 which overlaps with the reserved duration 203 but also ends at a later time (not shown for simplicity). Other wireless communication devices listening on the wireless channel CH_A (such as AP1, STA1, and STA2) may detect the transmission of PPDU4 and reset their NAVs according to the reserved duration 204. As a result of resetting their respective NAVs, AP1, STA1, and STA2 may (virtually) sense that the wireless channel CH_A is busy for at least the duration indicated by PPDU4 and continue to refrain from accessing the wireless medium.

Thus, by repeatedly transmitting PPDUs that extend the duration for which the wireless medium is reserved (before the expiry of the previously reserved duration), STA3 can monopolize access to the shared wireless medium or prevent other wireless communication devices in the vicinity (such as AP1, STA1, and STA2) from communicating on the wireless channel CH_A. If an AP is unable to broadcast beacon frames to its associated STAs, or the STAs are unable to receive such beacons, for an extended period of time (such as a threshold number of beacon intervals) the BSS may fail.

Aspects of the present disclosure recognize that a wireless communication device (such as AP1, STA1, or STA2) can avoid interference from a rogue device (such as STA3) by switching its communications to a new wireless channel that is different than the channel on which the rogue device is transmitting. For example, existing versions of the IEEE 802.11 standard define a channel switch announcement (CSA) element that can be used by an AP to signal a change in wireless channel for its BSS. However, existing wireless communication devices do not analyze wireless communications in OBSSs to detect rogue devices that may be monopolizing a shared wireless medium.

In some aspects, an AP (such as AP1) may determine that a rogue STA (such as STA3) is attempting to monopolize access to a shared wireless medium in response to setting one or more nonconforming NAVs. As used herein, the term "nonconforming NAV" refers to any NAV that extends the duration for which a wireless communication device has reserved access to a wireless channel (before the expiry of a previously reserved duration by the same device). With reference to FIG. 2, each NAV that is set (or reset) based on PPDU2, PPDU3, or PPDU4 is an example of a nonconforming NAV. In some implementations, an AP may switch the channel of its BSS to a new wireless channel after detecting a threshold number of nonconforming NAVs.

Figure 3:
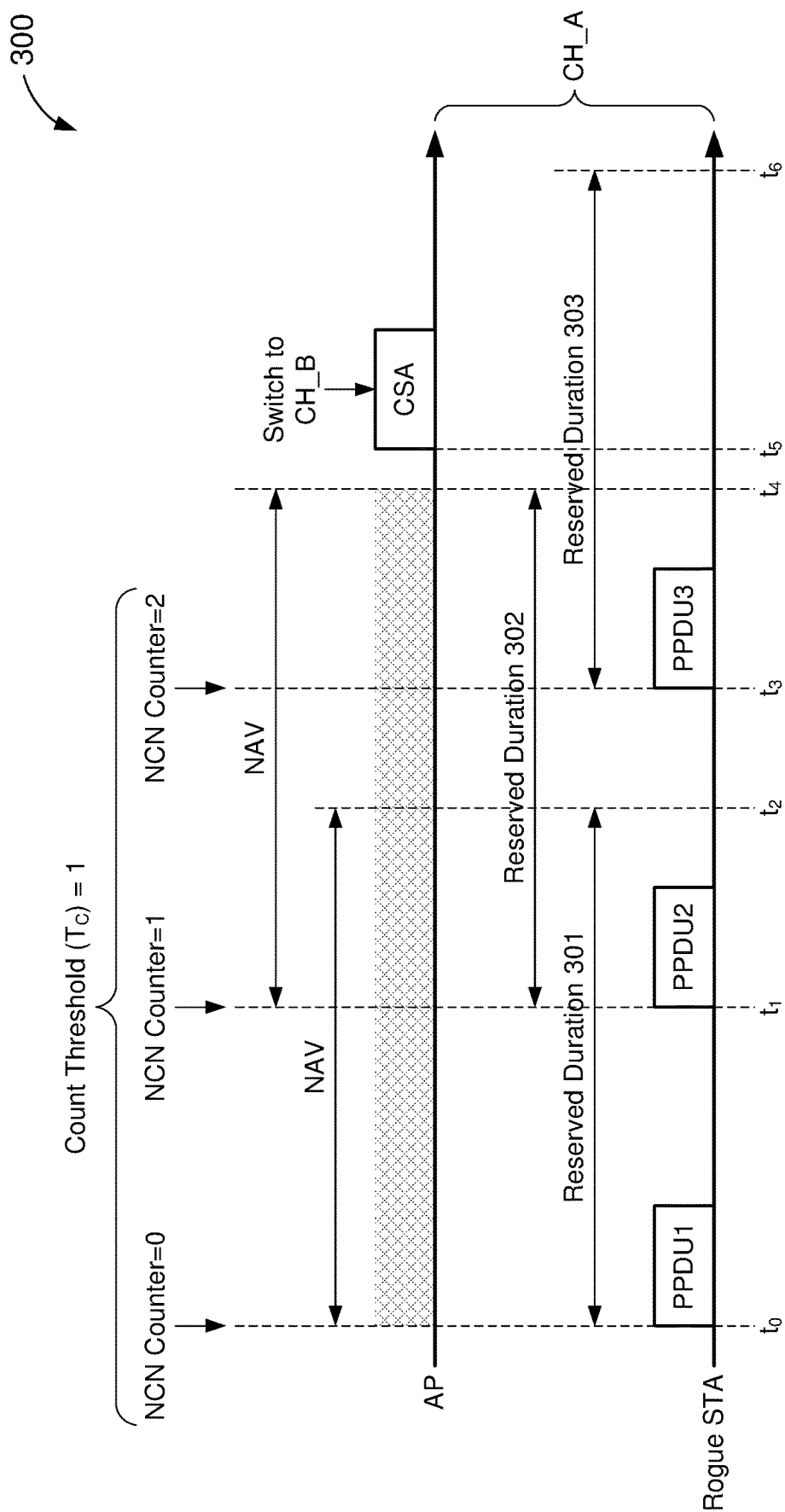
FIG. 3 shows a timing diagram depicting example wireless communications by an access point (AP) and a rogue wireless station (STA), according to some implementations.

FIG. 3 shows a timing diagram 300 depicting example wireless communications by an AP and a rogue STA, according to some implementations. In some implementations, the AP and the rogue STA may be examples of the access point AP1 and the wireless station STA3, respectively, of FIG. 1. With reference for example to FIG. 1, the AP may form a BSS that includes one or more STAs (not shown for simplicity) and the rogue STA may be associated with an OBSS that operates on the same wireless channel (CH_A) as the BSS. Due to the proximity of the wireless communication devices, wireless transmissions by the rogue STA can be detected by the AP.

In some aspects, the AP may analyze wireless communications on the current wireless channel CH_A to determine whether another wireless communication device is attempting to monopolize access to the wireless medium. For example, in response to detecting a PPDU that would cause the AP to set (or reset) its NAV for a given duration, the AP may determine whether the transmitting device has already reserved the wireless medium for a duration not yet expired. In other words, the AP may determine whether the transmitting device is attempting to use the PPDU to prolong its access to the wireless medium. If the new NAV duration would effectively allow the transmitting device to prolong its access to the wireless medium, the AP may classify the new NAV as a nonconforming NAV. In some implementations, the AP may increment a nonconforming NAV (NCN) counter in response to detecting a nonconforming NAV and switch its BSS to a new wireless channel after the counter reaches a threshold count value ($T_C$).

In the example of FIG. 3, the rogue STA transmits a first PPDU (PPDU1), at time to, that reserves the wireless medium for a duration 301 from times $t_0$ to $t_2$. The AP detects PPDU1 on the wireless channel CH_A and determines whether the duration 301 overlaps with another duration previously reserved by the rogue STA. For example, the AP may determine the duration 301 based on the duration field in the MAC header of PPDU1 and may identify the rogue device as the transmitting device based on a source address (SA) field in the MAC header of PPDU1. It is assumed that the reserved duration 301 does not overlap another duration previously reserved by the rogue STA. Thus, the AP sets its NAV according to the reserved duration 301 but does not increment its NCN counter (or may reset the NCN counter), in response to detecting PPDU1.

At time $t_1$, the rogue STA transmits a second PPDU (PPDU2) that reserves the wireless medium for a duration 302 from times $t_1$ to $t_4$. The AP detects PPDU2 on the current wireless channel CH_A and determines whether the duration 302 overlaps with another duration previously reserved by the rogue STA. For example, the AP may determine the duration 302 based on the duration field in the MAC header of PPDU2 and may identify the rogue STA as the transmitting device based on the SA field in the MAC header of PPDU2. As shown in FIG. 3, the duration 302 overlaps with the duration 301 already reserved by the rogue STA but ends at a later time. Thus, the AP increments its NCN counter in response to detecting PPDU2. In the example of FIG. 3, the threshold count value $T_C$ is equal to 1. Because the NCN counter has not yet exceeded the threshold count value $T_C$, the AP may reset its NAV according to the reserved duration 302.

At time $t_3$, the rogue STA transmits a third PPDU (PPDU3) that reserves the wireless medium for a duration 303 from times $t_3$ to $t_6$. The AP detects PPDU3 on the current wireless channel CH_A and determines whether the duration 303 overlaps with another duration previously reserved by the rogue STA. For example, the AP may determine the duration 303 based on the duration field in the MAC header of PPDU3 and may identify the rogue STA as the transmitting device based on the SA field in the MAC header of PPDU3. As shown in FIG. 3, the duration 303 overlaps with the duration 302 already reserved by the rogue STA but ends at a later time. Thus, the AP increments its NCN counter in response to detecting PPDU3, which causes the NCN counter to exceed the threshold count value $T_C$. As a result, the AP does not reset its NAV in response to detecting PPDU3. Rather, at time $t_5$ (after the expiry of its NAV), the AP transmits a CSA message to its associated STAs to switch the BSS to a new wireless channel (CH_B).

For example, the CSA message may be a management frame (such as a beacon or probe response frame) or action frame having a CSA element that indicates the new wireless channel for the BSS and a time at which the switch is scheduled to occur. In some aspects, the new wireless channel CH_B may be a predetermined channel that is known to the AP prior to determining that the NCN counter exceeds the threshold count value $T_C$. For example, the AP may select the new wireless channel CH_B from a list of predetermined wireless channels. In some other aspects, the AP may select the new wireless channel CH_B as a result of a channel scanning operation. For example, some APs have multiple wireless radios (or "cores") that can be used to listen for communications on multiple wireless channels, respectively. Thus, a multi-radio (MR) AP may continue listening for wireless communications on the current wireless channel CH_A (to maintain its BSS) while concurrently scanning other wireless channels for a suitable channel to switch to.

Figure 4A:
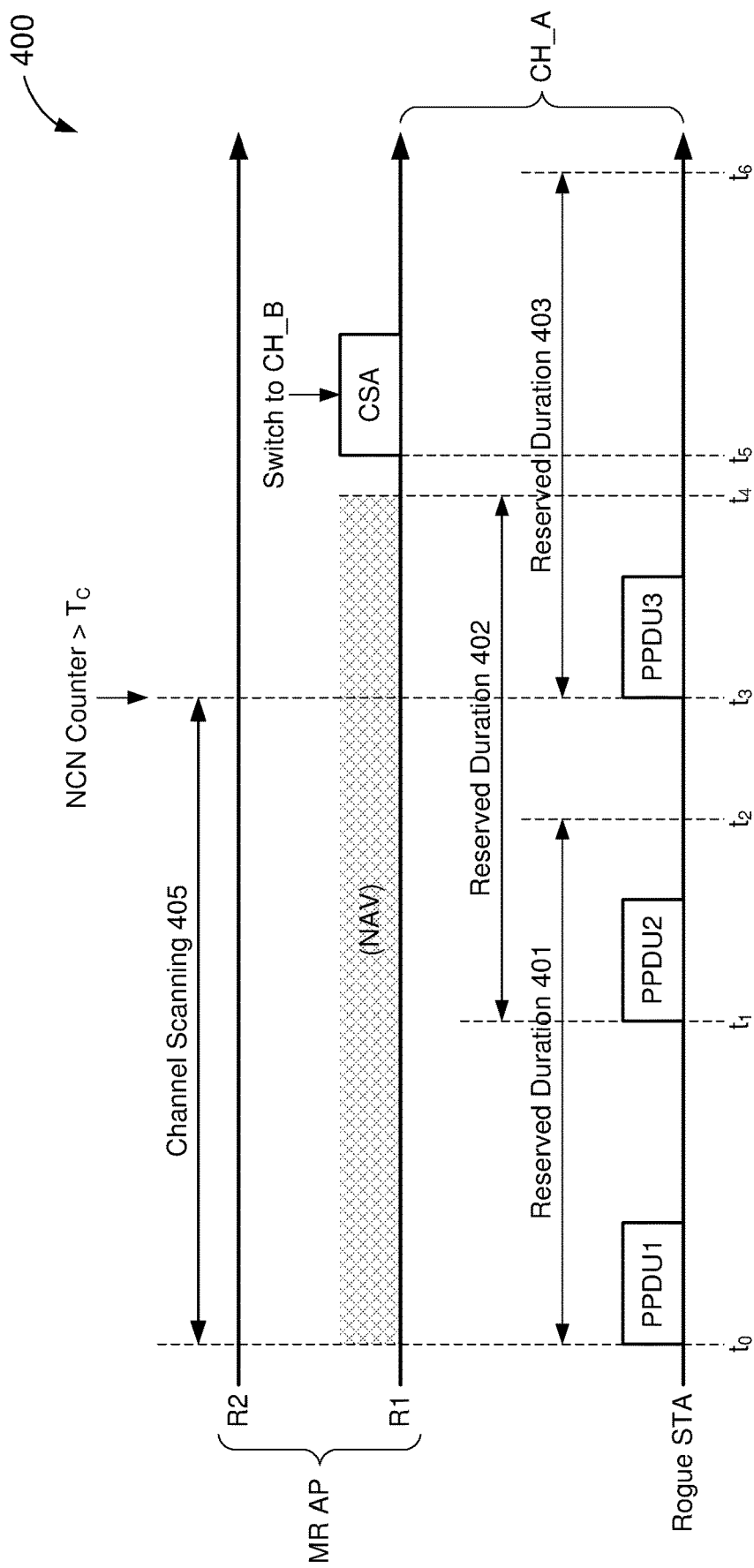
FIG. 4A shows a timing diagram depicting example wireless communications by a multi-radio (MR) AP and a rogue STA, according to some implementations.

FIG. 4A shows a timing diagram 400 depicting example wireless communications by an MR AP and a rogue STA, according to some implementations. In some implementations, the MR AP and the rogue STA may be examples of the AP and the rogue STA, respectively, of FIG. 3. Thus, the MR AP may form a BSS that includes one or more STAs (not shown for simplicity) and the rogue STA may be associated with an OBSS that operates on the same wireless channel (CH_A) as the BSS. In some aspects, the MR AP may monitor wireless communications on the current wireless channel CH_A to determine whether another wireless communication device is attempting to monopolize access to the shared wireless medium (such as described with reference to FIG. 3).

In some implementations, the MR AP may include a first wireless radio (R1) and a second wireless radio (R2). The first wireless radio R1 is the primary radio used to maintain or facilitate wireless communications in the BSS. Thus, the first wireless radio R1 is configured to communicate (or operate) on the same wireless channel (CH_A) as the OBSS. In some implementations, the MR AP may use the second wireless radio R2 to perform a channel scanning operation 405 while concurrently using the first wireless radio R1 to listen for wireless communications on the current wireless channel CH_A. For example, the MR AP may scan for a new wireless channel on which to operate its BSS should the current wireless channel CH_A become unsuitable for wireless communications. In the example of FIG. 4A, the MR AP may periodically perform the channel scanning operation 405 on a number of wireless channels even if it does not detect any PPDUs on the current wireless channel CH_A.

In the example of FIG. 4A, the rogue STA transmits a first PPDU (PPDU1), at time $t_0$, that reserves the wireless medium for a duration 401 from times $t_0$ to $t_2$. The MR AP detects PPDU1 via its first wireless radio R1 and determines whether the duration 401 overlaps with another duration previously reserved by the rogue STA (such as described with reference to FIG. 3). In some implementations, the MR AP may update (or reset) an NCN counter based on whether the duration 401 overlaps with a previously-reserved duration. At this time, the MR AP's NCN counter has not yet exceeded a threshold count value ($T_C$). Accordingly, the MR AP sets (or resets) its NAV according to the reserved duration 401 in response to detecting PPDU1.

At time $t_1$, the rogue STA transmits a second PPDU (PPDU2) that reserves the wireless medium for a duration 402 from times $t_1$ to $t_4$. The MR AP detects PPDU2 via its first wireless radio R1 and determines whether the duration 402 overlaps with another duration previously reserved by the rogue STA. As shown in FIG. 4A, the duration 402 overlaps with the duration 401 already reserved by the rogue STA but ends at a later time. Thus, the MR AP may increment its NCN counter in response to detecting PPDU2. At this time, the MR AP's NCN counter has not yet exceeded the threshold count value $T_C$. Accordingly, the AP sets (or resets) its NAV according to the reserved duration 402 in response to detecting PPDU2.

At time $t_3$, the rogue STA transmits a third PPDU (PPDU3) that reserves the wireless medium for a duration 403 from times $t_3$ to $t_6$. The MR AP detects PPDU3 via its first wireless radio R1 and determines whether the duration 403 overlaps with another duration previously reserved by the rogue STA. As shown in FIG. 4A, the duration 403 overlaps with the duration 402 already reserved by the rogue STA but ends at a later time. Thus, the MR AP may increment its NCN counter in response to detecting PPDU3, which causes the NON counter to exceed the threshold count value $T_C$. As a result, the MR AP may not reset its NAV in response to detecting PPDU3. Rather, at time $t_5$ (after the expiry of its NAV), the MR AP transmits a CSA message to its associated STAs to switch the BSS to a new wireless channel (CH_B).

In the example of FIG. 4A, the MR AP may select the new wireless channel CH_B as a result of the channel scanning operation 405. For example, the MR AP may determine that the new wireless channel CH_B has the least signal interference (or any other characteristics that may be desirable for its BSS) among the various wireless channels scanned. Because the channel scanning operation 405 is performed prior to determining that the NCN counter exceeds the threshold count value $T_C$, the MR AP can quickly switch its BSS to the new wireless channel CH_B after the expiry of its NAV. However, periodically performing the channel scanning operation 405 in the background may result in an inefficient utilization of the MR AP's resources since it does not account for the likelihood of whether the MR AP may need to switch its BSS to a different channel.

Figure 4B:
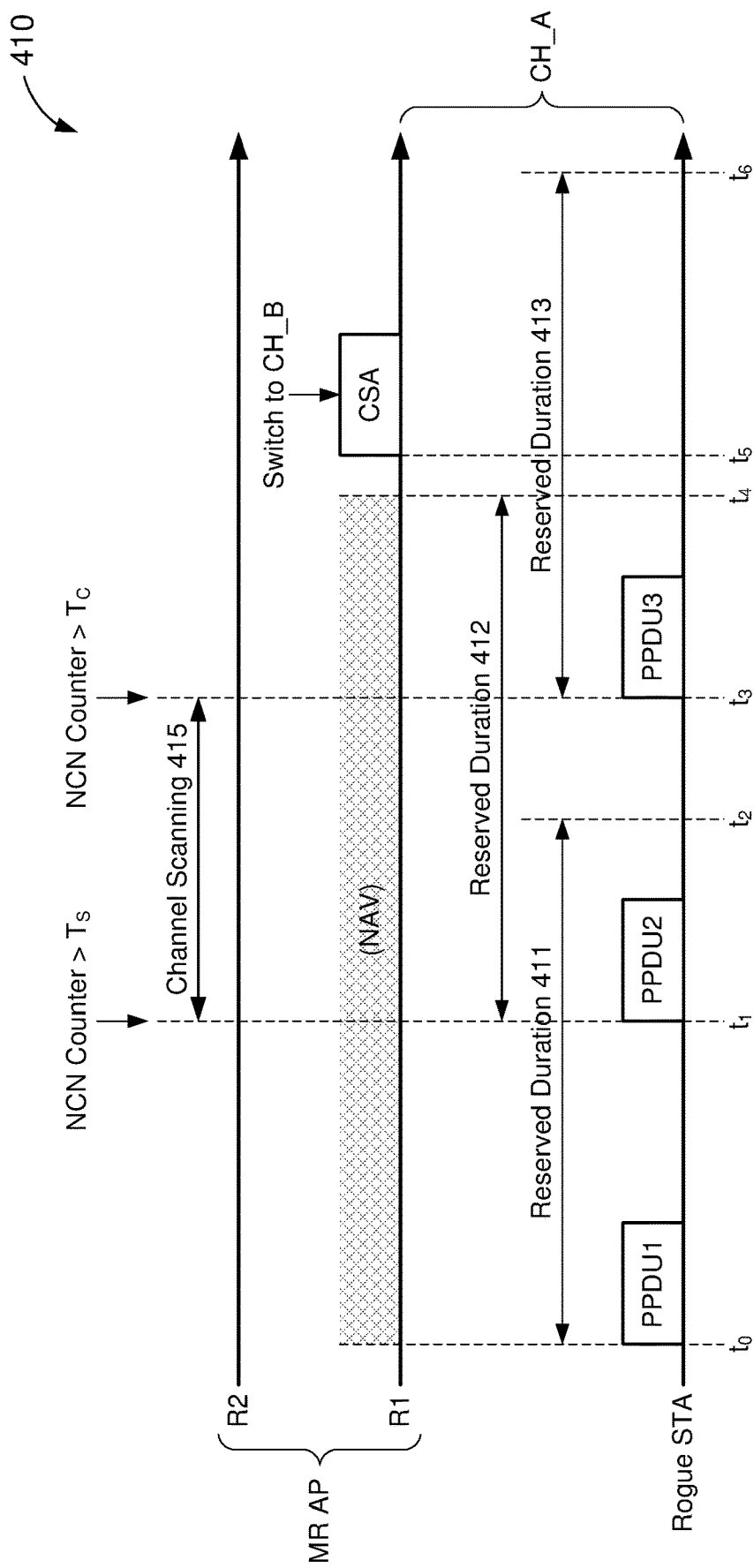
FIG. 4B shows another timing diagram depicting example wireless communications by an MR AP and a rogue STA, according to some implementations.

FIG. 4B shows another timing diagram 410 depicting example wireless communications by an MR AP and a rogue STA, according to some implementations. In some implementations, the MR AP and the rogue STA may be examples of the AP and the rogue STA, respectively, of FIG. 3. Thus, the MR AP may form a BSS that includes one or more STAs (not shown for simplicity) and the rogue STA may be associated with an OBSS that operates on the same wireless channel (CH_A) as the BSS. In some aspects, the MR AP may monitor wireless communications on the current wireless channel CH_A to determine whether another wireless communication device is attempting to monopolize access to the shared wireless medium (such as described with reference to FIG. 3).

In some implementations, the MR AP may include a first wireless radio (R1) and a second wireless radio (R2). The first wireless radio R1 is the primary radio used to maintain or facilitate wireless communications in the BSS. Thus, the first wireless radio R1 is configured to communicate (or operate) on the same wireless channel (CH_A) as the OBSS. In some implementations, the MR AP may use the second wireless radio R2 to perform a channel scanning operation 415 while concurrently using the first wireless radio R1 to listen for wireless communications on the current wireless channel CH_A. For example, the MR AP may scan for a new wireless channel on which to operate its BSS should the current wireless channel CH_A become unsuitable for wireless communications. In the example of FIG. 4B, the MR AP may perform the channel scanning operation 415 on a number of wireless channels after a threshold number ($T_S$) of nonconforming NAVs have been detected.

In the example of FIG. 4B, the rogue STA transmits a first PPDU (PPDU1), at time to, that reserves the wireless medium for a duration 411 from times $t_0$ to $t_2$. The MR AP detects PPDU1 via its first wireless radio R1 and determines whether the duration 411 overlaps with another duration previously reserved by the rogue STA (such as described with reference to FIG. 3). In some implementations, the MR AP may update (or reset) an NCN counter based on whether the duration 411 overlaps with a previously-reserved duration. At this time, the MR AP's NCN counter has not yet exceeded a threshold count value ($T_C$). Accordingly, the MR AP sets (or resets) its NAV according to the reserved duration 411 in response to detecting PPDU1.

At time $t_1$, the rogue STA transmits a second PPDU (PPDU2) that reserves the wireless medium for a duration 412 from times $t_1$ to $t_4$. The MR AP detects PPDU2 via its first wireless radio R1 and determines whether the duration 412 overlaps with another duration previously reserved by the rogue STA. As shown in FIG. 4B, the duration 412 overlaps with the duration 411 already reserved by the rogue STA but ends at a later time. Thus, the MR AP may increment its NCN counter in response to detecting PPDU2, which causes the NON counter to exceed the scan threshold $T_S$ but not the threshold count value $T_C$. As a result, the AP sets (or resets) its NAV according to the reserved duration 412 in response to detecting PPDU2 and initiates the channel scanning operation 415 via its second wireless radio R2.

At time $t_3$, the rogue STA transmits a third PPDU (PPDU3) that reserves the wireless medium for a duration 413 from times $t_3$ to $t_6$. The MR AP detects PPDU3 via its first wireless radio R1 and determines whether the duration 413 overlaps with another duration previously reserved by the rogue STA. As shown in FIG. 4B, the duration 413 overlaps with the duration 412 already reserved by the rogue STA but ends at a later time. Thus, the MR AP may increment its NCN counter in response to detecting PPDU3, which causes the NCN counter to exceed the threshold count value $T_C$. As a result, the MR AP may not reset its NAV in response to detecting PPDU3. Rather, at time $t_5$ (after the expiry of its NAV), the MR AP transmits a CSA message to its associated STAs to switch the BSS to a new wireless channel (CH_B).

In the example of FIG. 4B, the MR AP may select the new wireless channel CH_B as a result of the channel scanning operation 415. For example, the MR AP may determine that the new wireless channel CH_B has the least signal interference (or any other characteristics that may be desirable for its BSS) among the various wireless channels scanned. Because the channel scanning operation 415 is performed prior to determining that the NCN counter exceeds the threshold count value $T_C$, the MR AP can quickly switch its BSS to the new wireless channel CH_B after the expiry of its NAV. Moreover, the channel scanning operation 415 results in a more efficient utilization of the MR AP's resources compared to the channel scanning operation 405 of FIG. 4A because the channel scanning operation 415 is performed after a threshold number of nonconforming NAVs have been detected (which increases the likelihood that the MR AP may need to switch its BSS to a different channel).

Figure 4C:
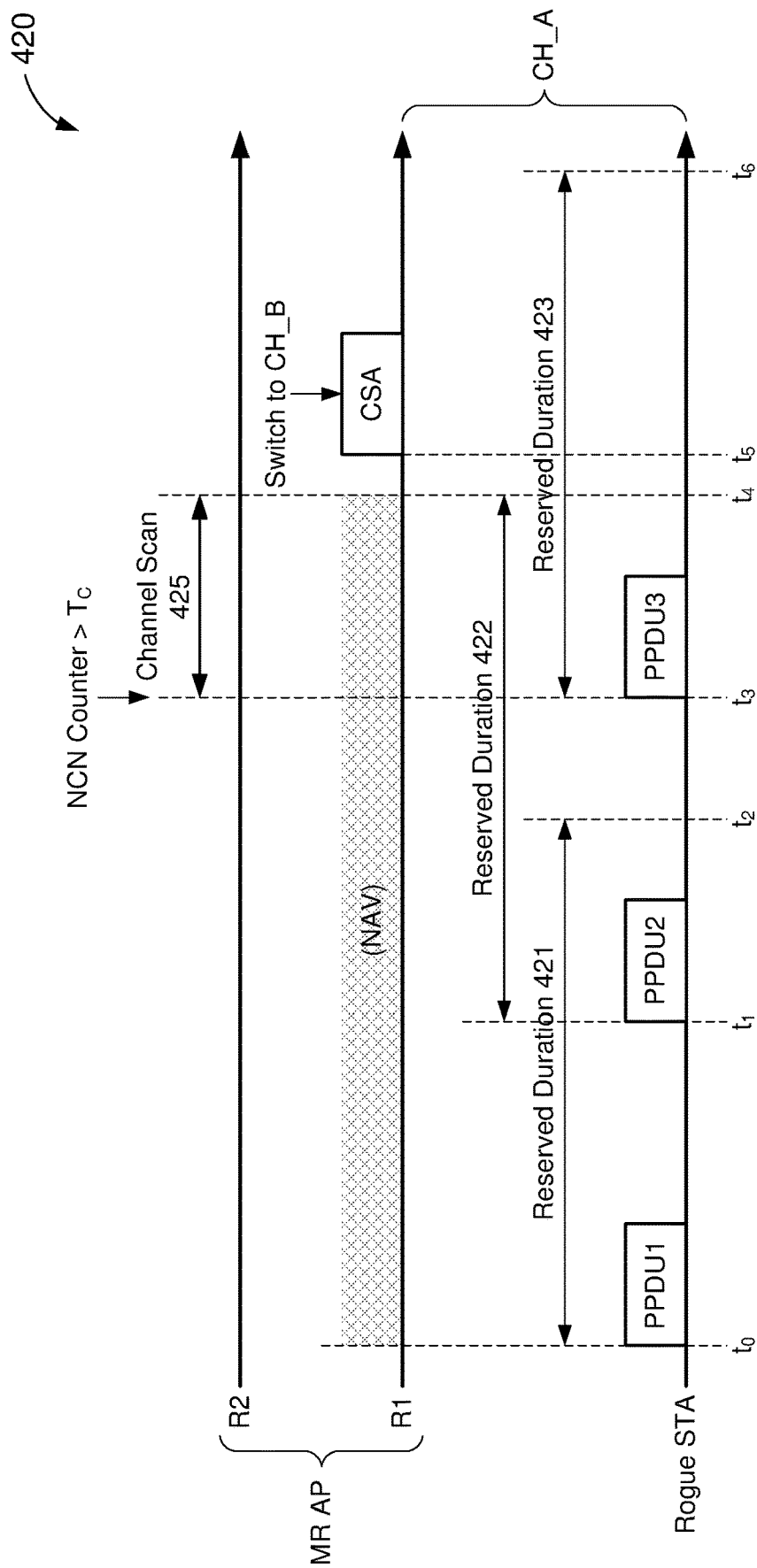
FIG. 4C shows another timing diagram depicting example wireless communications by an MR AP and a rogue STA, according to some implementations.

FIG. 4C shows another timing diagram 420 depicting example wireless communications by an MR AP and a rogue STA, according to some implementations. In some implementations, the MR AP and the rogue STA may be examples of the AP and the rogue STA, respectively, of FIG. 3. Thus, the MR AP may form a BSS that includes one or more STAs (not shown for simplicity) and the rogue STA may be associated with an OBSS that operates on the same wireless channel (CH_A) as the BSS. In some aspects, the MR AP may monitor wireless communications on the wireless channel CH_A to determine whether another wireless communication device is attempting to monopolize access to the shared wireless medium (such as described with reference to FIG. 3).

In some implementations, the MR AP may include a first wireless radio (R1) and a second wireless radio (R2). The first wireless radio R1 is the primary radio used to maintain or facilitate wireless communications in the BSS. Thus, the first wireless radio R1 is configured to communicate (or operate) on the same wireless channel (CH_A) as the OBSS. In some implementations, the MR AP may use the second wireless radio R2 to perform a channel scanning operation 425 while concurrently using the first wireless radio R1 to listen for wireless communications on the current wireless channel CH_A. For example, the MR AP may scan for a new wireless channel on which to operate its BSS should the current wireless channel CH_A become unsuitable for wireless communications. In the example of FIG. 4C, the MR AP may perform the channel scanning operation 425 on a number of wireless channels after an NON counter exceeds a threshold count value ($T_C$).

In the example of FIG. 4C, the rogue STA transmits a first PPDU (PPDU1), at time to, that reserves the wireless medium for a duration 421 from times $t_0$ to $t_2$. The MR AP detects PPDU1 via its first wireless radio R1 and determines whether the duration 421 overlaps with another duration previously reserved by the rogue STA (such as described with reference to FIG. 3). In some implementations, the MR AP may update (or reset) its NCN counter based on whether the duration 421 overlaps with a previously-reserved duration. At this time, the MR AP's NCN counter has not yet exceeded a threshold count value $T_C$. Accordingly, the MR AP sets (or resets) its NAV according to the reserved duration 421 in response to detecting PPDU1.

At time $t_1$, the rogue STA transmits a second PPDU (PPDU2) that reserves the wireless medium for a duration 422 from times $t_1$ to $t_4$. The MR AP detects PPDU2 via its first wireless radio R1 and determines whether the duration 422 overlaps with another duration previously reserved by the rogue STA. As shown in FIG. 4C, the duration 422 overlaps with the duration 421 already reserved by the rogue STA but ends at a later time. Thus, the MR AP may increment its NCN counter in response to detecting PPDU2. At this time, the MR AP's NCN counter has not yet exceeded the threshold count value $T_C$. Accordingly, the AP sets (or resets) its NAV according to the reserved duration 422 in response to detecting PPDU2.

At time $t_3$, the rogue STA transmits a third PPDU (PPDU3) that reserves the wireless medium for a duration 423 from times $t_3$ to $t_6$. The MR AP detects PPDU3 via its first wireless radio R1 and determines whether the duration 423 overlaps with another duration previously reserved by the rogue STA. As shown in FIG. 4C, the duration 423 overlaps with the duration 422 already reserved by the rogue STA but ends at a later time. Thus, the MR AP may increment its NCN counter in response to detecting PPDU3, which causes the NON counter to exceed the threshold count value $T_C$. As a result, the MR AP initiates the channel scanning operation 425 via its second wireless radio R2 and does not reset its NAV in response to detecting PPDU3. Rather, at time $t_5$ (after the expiry of its NAV), the MR AP transmits a CSA message to its associated STAs to switch the BSS to a new wireless channel (CH_B).

In the example of FIG. 4C, the MR AP may select the new wireless channel CH_B as a result of the channel scanning operation 425. For example, the MR AP may determine that the new wireless channel CH_B has the least signal interference (or any other characteristics that may be desirable for its BSS) among the various wireless channels scanned. Because the channel scanning operation 425 is performed after the NCN counter exceeds the threshold count value $T_C$, the channel scanning operation 425 may result in a more efficient utilization of the MR AP's resources compared to any of the channel scanning operations 405 or 415 of FIGS. 4A and 4B, respectively.

However, the channel scanning operation 425 may also create delays in switching the BSS to a new wireless channel. To reduce such delays in channel switching, the MR AP may scan only a limited number of wireless channels during the channel scanning operation 425. In some implementations, the MR AP may perform another channel scanning operation (also referred to as a "deferred channel scan"), via its second wireless radio R2, after switching operation of its first wireless radio R1 to the new wireless channel CH_B. For example, the MR AP may scan a greater number of wireless channel during the deferred channel scan than the channel scanning operation 425. Thus, the MR AP may select a more optimal wireless channel for its BSS as a result of the deferred channel scan.

As described with reference to FIG. 2, a CSA message may be a management frame or action frame having a CSA element that indicates the new wireless channel for a BSS and a time at which the switch is scheduled to occur. When switching wireless channels, an AP must ensure that the CSA message is received by each of its associated STAs. Some STAs may enter a low power mode, in which they are not actively listening to the shared wireless channel, after setting their NAVs for a relatively long duration. However, each STA must periodically receive beacon frames to maintain association with a BSS. An AP is configured to broadcast beacons at regularly scheduled beacon intervals, also referred to as target beacon transmission times (TBTTs). Although some STAs may skip one or more beacon intervals, aspects of the present disclosure recognize that each STA is required to be awake during a delivery traffic indication message (DTIM) period. Thus, in some aspects, the AP may transmit the CSA message during a scheduled DTIM period.

Figure 5A:
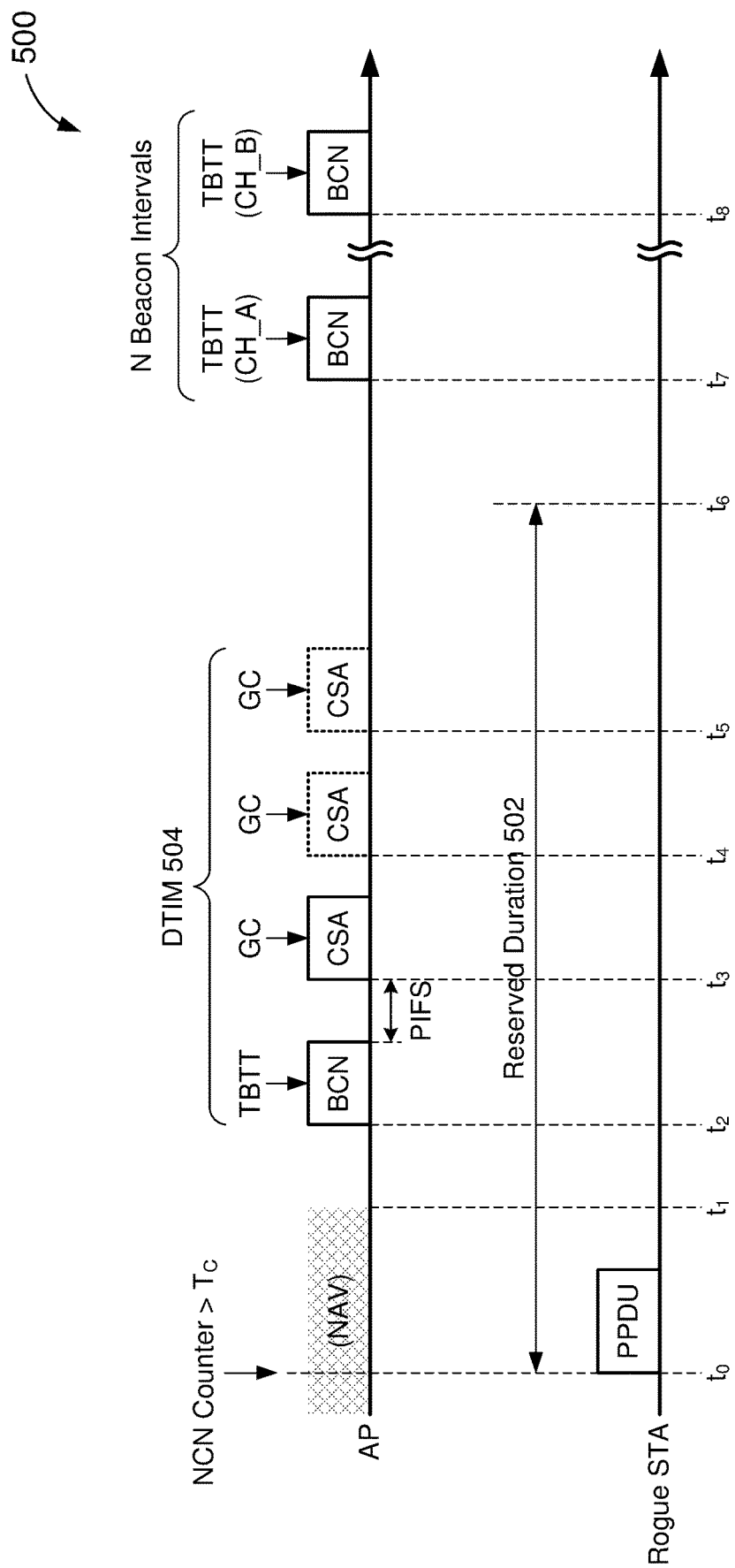
FIG. 5A shows a timing diagram depicting an example channel switching operation that can be performed by an AP in a vicinity of a rogue STA, according to some implementations.

FIG. 5A shows a timing diagram 500 depicting an example channel switching operation that can be performed by an AP in a vicinity of a rogue STA, according to some implementations. In some implementations, the AP and the rogue STA may be examples of the AP and the rogue STA, respectively, of FIG. 3. Thus, the AP may form a BSS that includes one or more STAs (not shown for simplicity) and the rogue STA may be associated with an OBSS that operates on the same wireless channel (CH_A) as the BSS. In some aspects, the AP may monitor wireless communications on the wireless channel CH_A to determine whether another wireless communication device is attempting to monopolize access to the shared wireless medium (such as described with reference to FIG. 3).

At time to, the rogue STA transmits a PPDU that reserves the wireless medium for a duration 502 from times $t_0$ to $t_6$. In the example of FIG. 5A, the AP has already set its NAV to expire, at time $t_1$, based on one or more PPDUs previously transmitted by the rogue STA (not shown for simplicity). Thus, the AP detects the PPDU on the current wireless channel CH_A and determines that the duration 502 overlaps with another duration previously reserved by the rogue STA (such as described with reference to FIG. 3). In some implementations, the AP may increment an NCN counter in response to detecting the PPDU, which causes the NCN counter to exceed a threshold count value ($T_C$). As a result, the AP does not reset its NAV in response to detecting the PPDU at time to.

At time $t_2$, the AP broadcasts a beacon frame (BCN) on the current wireless channel CH_A to maintain communications with its associated STAs. In the example of FIG. 5A, time $t_2$ coincides with a TBTT representing the start of a DTIM period 504. As such, each of the STAs associated with the BSS is expected to be awake to receive the beacon broadcast at time $t_2$. In some implementations, the DTIM period 504 may be the first DTIM period (associated with the BSS) immediately following the expiry of the NAV. In some aspects, the AP may transmit one or more CSA messages to its associated STAs during the DTIM period 504. For example, each CSA message may be an action frame having a CSA element that indicates a new wireless channel (CH_B) for the BSS and a number (N) of TBTTs after which the channel switch is scheduled to occur.

In some aspects, the new wireless channel CH_B may be a predetermined channel that is known to the AP prior to determining that the NCN counter exceeds the threshold count value $T_C$ (such as described with reference to FIG. 3). In some other aspects, the AP may select the new wireless channel CH_B as a result of a channel scanning operation (such as described with reference to FIGS. 4A-4C). In some implementations, the AP may periodically perform the scanning operation in the background (such as described with reference to FIG. 4A). In some other implementations, the AP may initiate the scanning operation after counting a threshold number (TS) of nonconforming NAVs (such as described with reference to FIG. 4B). Still further, in some implementations, the AP may initiate the scanning operation after determining that the NCN counter exceeds the threshold count value $T_C$ (such as described with reference to FIG. 4C).

In the example of FIG. 5A, each CSA message is groupcast (GC) to multiple STAs at once. For example, the AP may transmit a CSA message, at time $t_3$, that is addressed to a particular group of STAs (such as a multicast address) or all STAs associated with the BSS (such as a broadcast address). As shown in FIG. 5A, time $t_3$ may coincide with a point coordination function (PCF) interframe space (PIFS) duration following the beacon broadcast at the start of the DTIM period 504 (or after sensing an idle medium). In some implementations, the AP may transmit a "burst" of multiple CSA messages to increase the likelihood that each of the associated STAs receives at least one CSA message. For example, the AP may transmit a second CSA message, at time $t_4$, followed by a third CSA message, at time $t_5$.

In some implementations, the CSA messages may be separated by a short interframe space (SIFS) duration. In some other implementations, the CSA messages may be separated by separated by any other suitable duration.

Example suitable durations include, a reduced interframe space (RIFS), distributed coordination function (DCF) interframe space (DIFS), arbitrary interframe space (AIFS), extended interframe space (EIFS), or PIFS duration, among other examples. Although the CSA burst is shown to include three CSA messages, in actual implementations the AP may transmit fewer or more CSA messages than what is shown in FIG. 5A. For example, the number of CSA messages that are broadcast or multicast by the AP may be optimized for the BSS (such as to ensure that each associated STA receives at least one of the CSA messages).

At time $t_7$, the AP broadcasts another beacon frame on CH_A. For example, time $t_7$ may coincide with the next TBTT immediately following the TBTT at time $t_2$. After N consecutive beacon intervals, the BSS switches to the new wireless channel CH_B. In the example of FIG. 5, time $t_3$ coincides with the $N^{th}$ TBTT following the DTIM period. Thus, at time to, the AP broadcasts a beacon frame on the new wireless channel CH_B. Thereafter, the AP and its associated STAs may resume communications on the new wireless channel CH_B and avoid interference from the rogue STA (which continues to operate on the wireless channel CH_A).

Figure 5B:
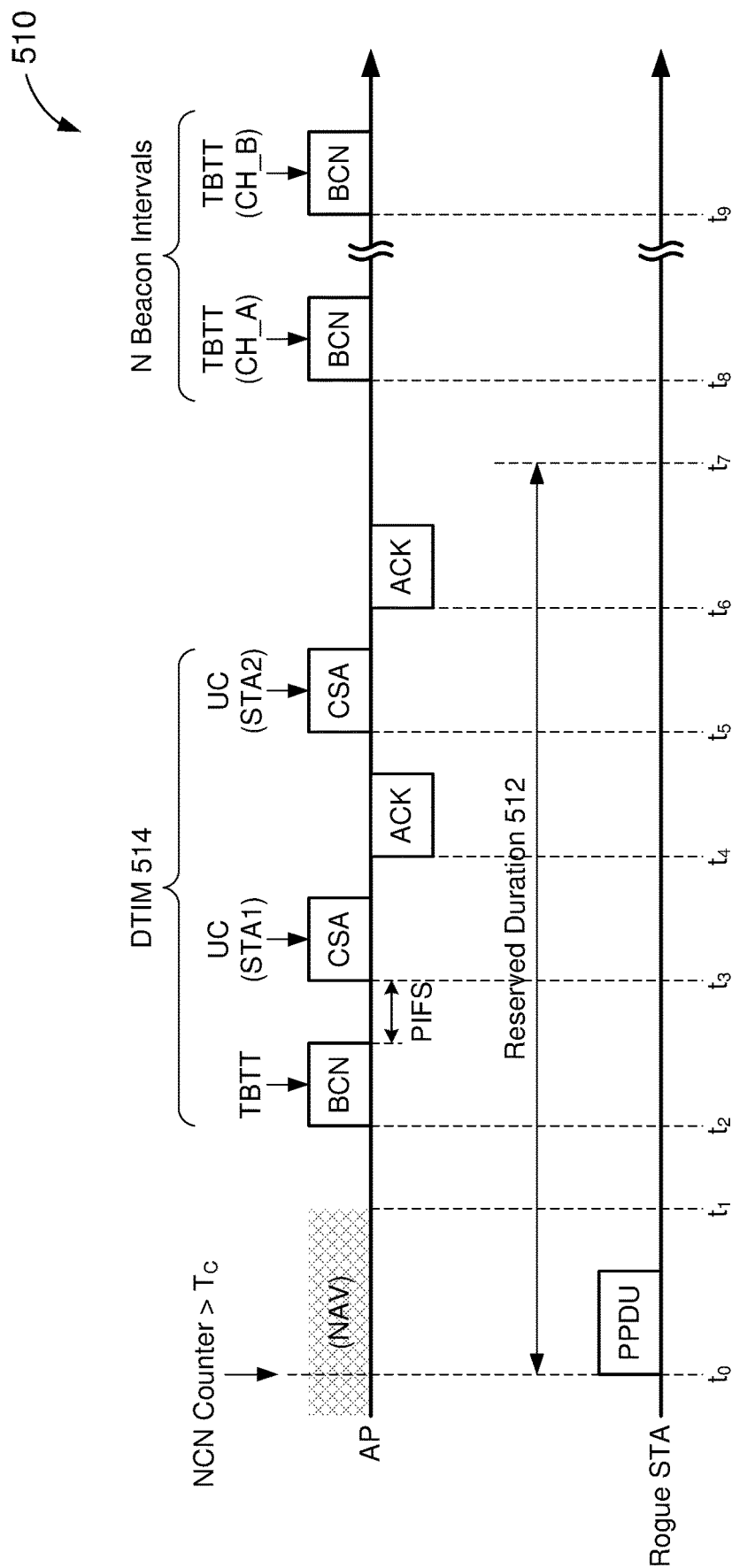
FIG. 5B shows another timing diagram depicting an example channel switching operation that can be performed by an AP in a vicinity of a rogue STA, according to some implementations.

FIG. 5B shows another timing diagram 510 depicting an example channel switching operation that can be performed by an AP in a vicinity of a rogue STA, according to some implementations. In some implementations, the AP and the rogue STA may be examples of the AP and the rogue STA, respectively, of FIG. 3. Thus, the AP may form a BSS that includes one or more STAs (not shown for simplicity) and the rogue STA may be associated with an OBSS that operates on the same wireless channel (CH_A) as the BSS. In some aspects, the AP may monitor wireless communications on the wireless channel CH_A to determine whether another wireless communication device is attempting to monopolize access to the shared wireless medium (such as described with reference to FIG. 3).

At time to, the rogue STA transmits a PPDU that reserves the wireless medium for a duration 512 from times $t_0$ to $t_7$. In the example of FIG. 5B, the AP has already set its NAV to expire, at time $t_1$, based on one or more PPDUs previously transmitted by the rogue STA (not shown for simplicity). Thus, the AP detects the PPDU on the current wireless channel CH_A and determines that the duration 512 overlaps with another duration previously reserved by the rogue STA (such as described with reference to FIG. 3). In some implementations, the AP may increment an NCN counter in response to detecting the PPDU, which causes the NCN counter to exceed a threshold count value ($T_C$). As a result, the AP does not reset its NAV in response to detecting the PPDU at time to.

At time $t_2$, the AP broadcasts a beacon frame (BCN) on the current wireless channel CH_A to maintain communications with its associated STAs. In the example of FIG. 5B, time $t_2$ coincides with a TBTT representing the start of a DTIM period 514. As such, each of the STAs associated with the BSS is expected to be awake to receive the beacon broadcast at time $t_2$. In some implementations, the DTIM period 514 may be the first DTIM period (associated with the BSS) immediately following the expiry of the NAV. In some aspects, the AP may transmit one or more CSA messages to its associated STAs during the DTIM period 514. For example, each CSA message may be an action frame having a CSA element that indicates a new wireless channel (CH_B) for the BSS and a number (N) of TBTTs after which the channel switch is scheduled to occur.

In some aspects, the new wireless channel CH_B may be a predetermined channel that is known to the AP prior to determining that the NCN counter exceeds the threshold count value $T_C$ (such as described with reference to FIG. 3). In some other aspects, the AP may select the new wireless channel CH_B as a result of a channel scanning operation (such as described with reference to FIGS. 4A-4C). In some implementations, the AP may periodically perform the scanning operation in the background (such as described with reference to FIG. 4A). In some other implementations, the AP may initiate the scanning operation after counting a threshold number (TS) of nonconforming NAVs (such as described with reference to FIG. 4B). Still further, in some implementations, the AP may initiate the scanning operation after determining that the NCN counter exceeds the threshold count value $T_C$ (such as described with reference to FIG. 4C).

In the example of FIG. 5B, each CSA message is unicast (UC) to a respective STA associated with the AP. For example, the AP may transmit a first CSA message, at time $t_3$, that is addressed to a first STA (STA1) and may transmit a second CSA message, at time $t_5$, that is addressed to a second STA (STA2). As shown in FIG. 5B, time $t_3$ may coincide with a PIFS duration following the beacon broadcast at the start of the DTIM period 514 (or after sensing an idle medium). Because each CSA message is a unicast frame, each receiving device is expected to transmit an ACK message back to the AP a SIFS duration after receiving the CSA message. In some implementations, the AP may wait to receive an ACK message from STA1, such as at time $t_4$, before transmitting the second CSA message to STA2. If the AP does not receive an ACK message within a SIFS duration after the first CSA message, the AP may retransmit the first CSA message to STA1. The AP may repeat the same process until it receives an ACK message from STA2 (such as time $t_6$).

In some implementations, the AP may transmit each subsequent CSA message a SIFS duration after receiving an ACK message for a previous CSA message. In some other implementations, the CSA messages may be transmitted after any other suitable duration. Example suitable durations include, a RIFS, DIFS, AIFS, EIFS, or PIFS duration, among other examples. Although the BSS is shown to include two wireless stations STA1 and STA2, in actual implementations the BSS may include fewer or more STAs than what is shown in FIG. 5B. By transmitting unicast CSA messages to individual STAs, the AP can ensure that each of its associated STAs receives a CSA message indicating the channel switch. However, depending on the number of STAs associated with its BSS, the AP may need to transmit more unicast CSA messages compared to the groupcast CSA messages of FIG. 5A.

Figure 6:
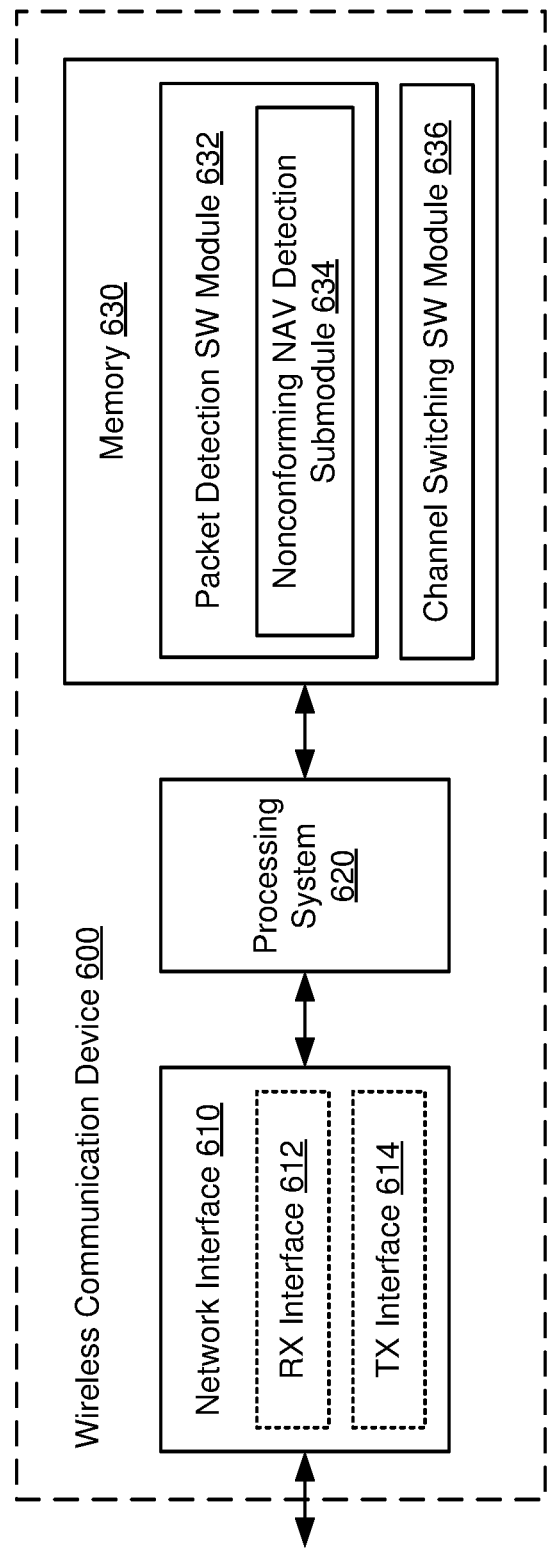
FIG. 6 shows a block diagram of an example wireless communication device, according to some implementations.

FIG. 6 shows a block diagram of an example wireless communication device 600, according to some implementations. The wireless communication device 600 can be a chip, system-on-a-chip (SoC), chipset, package, or device that includes at least one processor and at least one modem. In some implementations, the wireless communication device 600 may be one example of any of the APs or MR APs of FIGS. 1-5B.

The wireless communication device 600 includes a network interface 610, a processing system 620, and a memory 630. The network interface 610 is configured to communicate with one or more other wireless communication devices. For example, the network interface 610 may include a receive (RX) interface 612 and a transmit (TX) interface 614. The RX interface 612 is configured to receive RX signals, over a wireless channel, from one or more other wireless communication devices and the TX interface 614 is configured to transmit TX signals, over a wireless channel, to one or more other wireless communication devices.

The memory 630 may include a non-transitory computer-readable medium (including one or more nonvolatile memory elements, such as EPROM, EEPROM, Flash memory, or a hard drive, among other examples) that may store at least the following software (SW) modules:

- a packet detection SW module 632 to detect, on a first wireless channel, a first packet transmitted by a neighboring device, where the first packet has a duration field indicating a duration for which the first wireless channel is reserved by the neighboring device, and where the packet detection SW module 632 further includes:
  - a nonconforming NAV detection submodule 634 to detect, on the first wireless channel, a second packet transmitted by the neighboring device, where the second packet has a duration field indicating a duration that overlaps with the duration indicated by the first packet and ends later than the duration indicated by the first packet; and
- a channel switching SW module 636 to selectively switch a BSS associated with the wireless communication device 600 from the first wireless channel to a second wireless channel based at least in part on detecting the second packet.

Each software module includes instructions that, when executed by the processing system 620, causes the wireless communication device 600 to perform the corresponding functions.

The processing system 620 may include any suitable one or more processors capable of executing scripts or instructions of one or more software programs stored in the wireless communication device 600 (such as in the memory 630). For example, the processing system 620 may execute the packet detection SW module 632 to detect, on a first wireless channel, a first packet transmitted by a neighboring device, where the first packet has a duration field indicating a duration for which the first wireless channel is reserved by the neighboring device. In executing the packet detection SW module 632, the processing system 620 may further execute the nonconforming NAV detection submodule 634 to detect, on the first wireless channel, a second packet transmitted by the neighboring device, where the second packet has a duration field indicating a duration that overlaps with the duration indicated by the first packet and ends later than the duration indicated by the first packet. The processing system 620 also may execute the channel switching SW module 636 to selectively switch a BSS associated with the wireless communication device 600 from the first wireless channel to a second wireless channel based at least in part on detecting the second packet.

Figure 7:
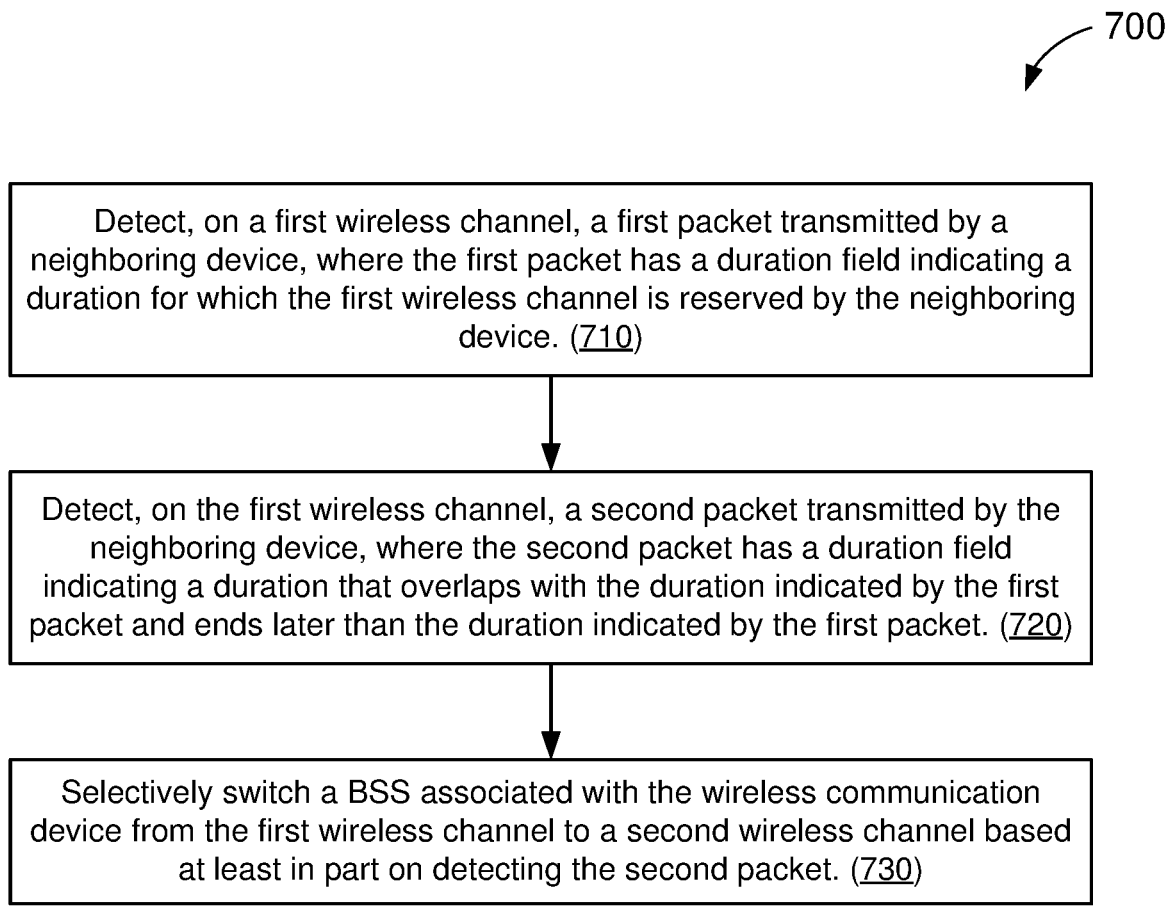
FIG. 7 shows an illustrative flowchart depicting an example channel switching operation based on nonconforming network allocation vector (NAV) detection, according to some implementations.

FIG. 7 shows an illustrative flowchart depicting an example channel switching operation 700 based on nonconforming NAV detection, according to some implementations. In some implementations, the example operation 700 may be performed by a wireless communication device such as any of the APs or MR APs of FIG. 1-5B or the wireless communication device 600 of FIG. 6.

The wireless communication device detects, on a first wireless channel, a first packet transmitted by a neighboring device, where the first packet has a duration field indicating a duration for which the first wireless channel is reserved by the neighboring device (710). The wireless communication device further detects, on the first wireless channel, a second packet transmitted by the neighboring device, where the second packet has a duration field indicating a duration that overlaps with the duration indicated by the first packet and ends later than the duration indicated by the first packet (720). The wireless communication device selectively switches a BSS associated with the wireless communication device from the first wireless channel to a second wireless channel based at least in part on detecting the second packet (730).

In some aspects, the wireless communication device may increment a counter responsive to detecting the second packet and determine whether the counter exceeds a threshold value. In some implementations, the wireless communication device may further detect, on the first wireless channel, a third packet transmitted by the neighboring device, where the third packet has a duration field indicating a duration that overlaps with the duration indicated by the second packet and ends later than the duration indicated by the second packet; and increment the counter responsive to detecting the third packet.

In some aspects, the selective switching of the BSS includes switching the BSS to the second wireless channel responsive to determining that the counter exceeds the threshold value. In some implementations, the second wireless channel may be a predetermined wireless channel known to the wireless communication device prior to determining that the counter exceeds the threshold value.

In some other implementations, the wireless communication device may select the second wireless channel from a plurality of wireless channels based on a channel scanning operation performed via a first wireless radio while concurrently listening to the first wireless channel via a second wireless radio. In some implementations, the channel scanning operation may be performed prior to determining that the counter exceeds the threshold value. In some other implementations, the channel scanning operation may be performed responsive to determining that the counter exceeds the threshold value.

In some aspects, the switching of the BSS may include transmitting, on the first wireless channel, one or more CSA messages each indicating a time at which the BSS switches from the first wireless channel to the second wireless channel. In some implementations, the one or more CSA messages are transmitted during a DTIM period associated with the BSS. In some implementations, each of the one or more CSA messages may be broadcast or multicast to a plurality of STAs. In some implementations, the one or more CSA messages may be separated by a SIFS duration.

In some other implementations, each of the one or more CSA messages may be unicast to a respective STA. In such implementations, the wireless communication device may further listen for an ACK responsive to the transmission of a first CSA message of the one or more CSA messages; and retransmit the first CSA message, before transmitting a second CSA message of the one or more CSA messages, if an ACK is not received a SIFS duration following the transmission of the first CSA message.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for wireless communication by a wireless communication device, comprising:
   detecting, on a first wireless channel, a first packet transmitted by a neighboring device, the first packet having a duration field indicating a duration for which the first wireless channel is reserved by the neighboring device;
   detecting, on the first wireless channel, a second packet transmitted by the neighboring device, the second packet having a duration field indicating a duration that overlaps with the duration indicated by the first packet and ends later than the duration indicated by the first packet; and
   selectively switching a basic service set (BSS) associated with the wireless communication device from the first wireless channel to a second wireless channel based at least in part on detecting the second packet.

2. The method of claim 1, further comprising:
   incrementing a counter responsive to detecting the second packet; and
   determining whether the counter exceeds a threshold value.

3. The method of claim 2, further comprising:
   detecting, on the first wireless channel, a third packet transmitted by the neighboring device, the third packet having a duration field indicating a duration that overlaps with the duration indicated by the second packet and ends later than the duration indicated by the second packet; and
   incrementing the counter responsive to detecting the third packet.

4. The method of claim 2, wherein the selective switching of the BSS comprises:
   switching the BSS to the second wireless channel responsive to determining that the counter exceeds the threshold value.

5. The method of claim 4, wherein the second wireless channel is a predetermined wireless channel known to the wireless communication device prior to determining that the counter exceeds the threshold value.

6. The method of claim 4, further comprising:
   selecting the second wireless channel from a plurality of wireless channels based on a channel scanning operation performed via a first wireless radio while concurrently listening to the first wireless channel via a second wireless radio.

7. The method of claim 6, wherein the channel scanning operation is performed prior to determining that the counter exceeds the threshold value.

8. The method of claim 6, wherein the channel scanning operation is performed responsive to determining that the counter exceeds the threshold value.

9. The method of claim 4, wherein the switching of the BSS comprises:
   transmitting, on the first wireless channel, one or more channel switch announcement (CSA) messages each indicating a time at which the BSS switches from the first wireless channel to the second wireless channel.

10. The method of claim 9, wherein the one or more CSA messages are transmitted during a delivery traffic indication message (DTIM) period associated with the BSS.

11. The method of claim 9, wherein each of the one or more CSA messages is broadcast or multicast to a plurality of wireless stations (STAs).

12. The method of claim 11, wherein the one or more CSA messages are separated by a short interframe space (SIFS) duration.

13. The method of claim 9, wherein each of the one or more CSA messages is unicast to a respective STA.

14. The method of claim 13, further comprising:
   listening for an acknowledgement (ACK) responsive to the transmission of a first CSA message of the one or more CSA messages; and
   retransmitting the first CSA message, before transmitting a second CSA message of the one or more CSA messages, if an ACK is not received a SIFS duration following the transmission of the first CSA message.

15. A wireless communication device, comprising:
   a processing system; and
   a memory storing instructions that, when executed by the processing system, cause the wireless communication device to:
      detect, on a first wireless channel, a first packet transmitted by a neighboring device, the first packet having a duration field indicating a duration for which the first wireless channel is reserved by the neighboring device;
      detect, on the first wireless channel, a second packet transmitted by the neighboring device, the second packet having a duration field indicating a duration that overlaps with the duration indicated by the first packet and ends later than the duration indicated by the first packet; and
      selectively switch a basic service set (BSS) associated with the wireless communication device from the first wireless channel to a second wireless channel based at least in part on detecting the second packet.

16. The wireless communication device of claim 15, wherein execution of the instructions further causes the wireless communication device to:

increment a counter responsive to detecting the second packet;

determine whether the counter exceeds a threshold value; and switch the BSS to the second wireless channel responsive to determining that the counter exceeds the threshold value.

17. The wireless communication device of claim 16, wherein the second wireless channel is a predetermined wireless channel known to the wireless communication device prior to determining that the counter exceeds the threshold value.

18. The wireless communication device of claim 16, wherein execution of the instructions further causes the wireless communication device to:

select the second wireless channel from a plurality of wireless channels based on a channel scanning operation performed via a first wireless radio while concurrently listening to the first wireless channel via a second wireless radio.

19. The wireless communication device of claim 16, wherein the switching of the BSS comprises:

transmitting, on the first wireless channel, one or more channel switch announcement (CSA) messages each indicating a time at which the BSS switches from the first wireless channel to the second wireless channel.

20. The wireless communication device of claim 19, wherein the one or more CSA messages are transmitted during a delivery traffic indication message (DTIM) period associated with the BSS.

* * * * *